United States Patent [19]
Uffner

[11] 3,787,224
[45] Jan. 22, 1974

[54] GLASS FIBER REINFORCED ELASTOMERS

[75] Inventor: William E. Uffner, Newark, Ohio

[73] Assignee: Owens-Corning Fiberglas Corporation, Toledo, Ohio

[22] Filed: Apr. 24, 1972

[21] Appl. No.: 230,723

[52] U.S. Cl. .................. 117/72, 57/140 G, 57/153, 117/126 GB, 260/285 B, 260/846
[51] Int. Cl. ...................... B32b 17/10, B32b 25/02
[58] Field of Search... 57/153, 140; 260/285 B, 846; 117/126 GB, 72

[56] References Cited
UNITED STATES PATENTS
3,567,671  3/1971  Janetos et al. ............... 117/126 GB Primary Examiner—William D. Martin
Assistant Examiner—William H. Schmidt
Attorney, Agent, or Firm—Carl G Staelin et al.

[57] ABSTRACT

This invention is addressed to the improvement in the bonding relationship between glass fibers and elastomeric materials, wherein glass fibers are treated with a composition formulated to contain a resorcinol-aldehyde resin, a butadiene-styrene vinyl pyridine terpolymer, an incompatible wax and a dicarboxylated butadiene-styrene resin.

17 Claims, 3 Drawing Figures

PATENTED JAN 22 1974 3,787,224

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers", as used herein, is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air or other attenuating force directed angularly downwardly onto multiple streams of molten glass issuing from a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and particularly copolymers of butadiene with these and terpolymers thereof with styrene and synthetic rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from three to twenty carbon atoms, such as propylene, and a polyene, such as dicylopentadiene, 1,4-hexadiene and preferably an alkylene or alkylidene norbornene, such as 5-alkylidene-2-norbornene and the like in which the alkylidene group numbers from two to twelve carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature thereby resulting in the formation of a thin but tenacious film of moisture on the glass fiber surfaces which serves to destroy any bond, chemical or physical, which would otherwise be formed between the glass fiber surfaces and the elastomeric material with which the glass fibers are combined.

To minimize the problems of binding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

One such composition which can be used in the treatment of individual glass fibers or bundles of glass fibers as outlined above is described in U.S. Pat. No. 3,567,671 in which description is made of a treating composition formulated to include a resorcinol-aldehyde resin, a butadiene-styrene-vinyl pyridine terpolymer, a latex component and an incompatible wax. As the latex component, use can be made of copolymers of vinyl chloride and vinylidene chloride, an acrylic resin latex in the form of a polymethylmethacrylate latex or a carboxylated butadiene-styrene resin latex.

The carboxylated butadiene styrene resin latex suggested for use in the composition of the foregoing patent is a monocarboxylated system prepared by copolymerization of butadiene and styrene in aqueous emulsion in the presence of a small amount of an ethylenically unsaturated carboxylic acid, and is commercially available from the Chemical Division, Goodyear Tire and Rubber Company in Akron, Ohio, under the trade name "Pliolite 480."

While compositions of the type disclosed and claimed in the foregoing patent represent a significant advance in the art in the treatment of glass fibers for use as reinforcement for elastomeric materials, there is nevertheless room for improvement in the stability of such systems and in the adhesion between the treated glass fibers and elastomeric materials with which the glass fibers are combined.

It is accordingly an object of the present invention to provide an improved composition for use in the treatment of individual glass fibers to form a thin coating on the surfaces thereof, or preferably for use in the treatment of bundles of glass fibers, as by impregnation, to promote the bonding relationship of glass fibers with elastomeric materials in the manufacture of glass fiber-reinforced elastomeric products.

It is a more specific object of the invention to provide an improved composition for the treatment of glass fibers having improved stability, low viscosity growth in use and minimum scumming characteristics.

It is a related object of the invention to produce coated glass fibers and impregnated bundles of glass fibers for use as reinforcement for elastomeric materials which are characterized by improved adhesion characteristics.

These and other objects and advantages of the invention will appear more fully hereinafter, and, for purposes of illustration, but not of limitation, embodiments of the invention are shown in the accompanying drawing in which.

Figure 1:
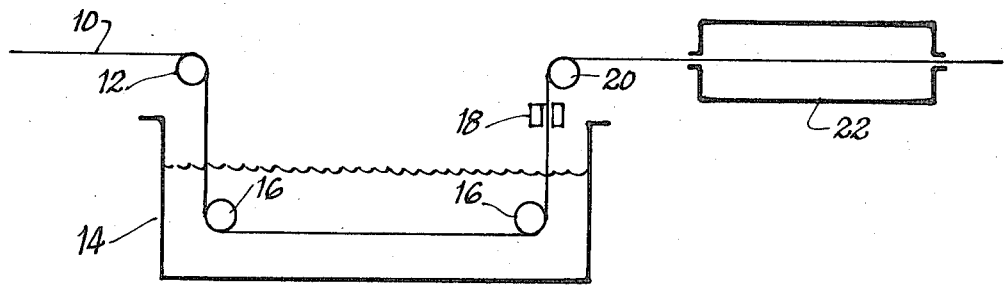
FIG. 1 is a schematic illustration of one method for the impregnation of a bundle of glass fibers in accordance with the preferred practice of the invention.

The concepts of this invention reside in an improved composition for use in the treatment of glass fibers formulated to include, as the essential components, a resorcinol-aldehyde resin, a vinyl pyridine-butadiene-styrene terpolymer, an incompatible wax and a dicarboxylated butadiene-styrene resin. It has been unexpectedly found that the use of a dicarboxylated butadiene-styrene resin in the glass fiber treating composition is capable of providing treated glass fibers having significantly greater adhesion to elastomeric materials when the treated glass fibers are combined with elastomeric materials in the manufacture of glass fiber-reinforced elastomeric products as compared to compositions of the type described in the foregoing patent containing a monocarboxylated butadiene-styrene resin. In addition, the dicarboxylated butadiene-styrene resin provides a glass fiber treating composition having greater stability, which is less susceptible to scum formation during use and which exhibits very low viscosity growth on aging.

As used herein, the term "dicarboxylated butadiene-styrene resin" refers to butadiene-styrene copolymers prepared by copolymerization of butadiene and styrene in the presence of a small amount of a dicarboxylic acid containing ethylenic unsaturation. The ratio of styrene to butadiene is at least 50/50, and is preferably within the range of 50/50 to 85/15. Such resins are commercially available in the form of latices from the Chemical Division of the Goodyear Tire and Rubber Co. in Akron, Ohio, under the trade names Pliolite 4000, Pliolite 4264, Pliolite 4121, Pliolite 4303, Pliolite 386, Pliolite 402 and Pliolite 388.

Without limiting the present invention as to theory, it is believed that the clean running characteristics as well as the improved stability of the composition of this invention can be attributed at least in part to the fact that the dicarboxylated resin latices used in the practice of this invention contain small amounts of emulsifiers, frequently less than 2 percent by weight and of the order of about 1 percent by weight. Monocarboxylated butadiene-styrene resin latices generally contain 4 percent to 6 percent by weight emulsifier which, it is believed, frequently contributes to scum formation.

Another distinction of the dicarboxylated butadiene-styrene resin systems used in the practice of this invention, as compared to the monocarboxylated system of the prior art, resides in the fact that the dicarboxylated systems are self-reactive. Whereas the monocarboxylated resin requires the use of a curing agent such as zinc oxide or melamine-formaldehyde condensates, the dicarboxylated butadiene-styrene resins are capable of cure or cross-linking by heat alone with the use of extraneous curing agents. Again, without limiting the present invention as to theory, it is believed that the ability of the dicarboxylated butadiene-styrene resins to undergo heat initiated cross-linking materially contributes to the improved adhesion characteristics of the treated glass fibers.

The dicarboxylated butadiene-styrene resin preferably constitutes from 15 to 40 parts by weight, and preferably 20 to 30 parts by weight, on a dry solid basis, of the composition of the invention.

The resorcinol-aldehyde resin component of the composition of this invention contributes materially to the adhesion of the resulting composition to the perfectly smooth, non-porous hydrophilic glass fiber surfaces, and is preferably a resin formed by reaction of the resorcinol with a lower aliphatic aldehyde containing one to three carbon atoms, such as formaldehyde, acetaldehyde and propionaldehyde. Preferred resins for use in the present invention are resorcinol-formaldehyde resins which are formed by the condensation reaction of formaldehyde with resorcinol in a mole ratio of about 2 moles of resorcinol to 1 mole of formaldehyde. Suitable resins are commercially available such as, for example, Penacolite R2170 from the Koppers Company in the form of a solution containing 75 percent solids. In general, use is preferably made of an amount of resorcinol-aldehyde resin to provide resorcinol-formaldehyde resin solids within the range of 2 to 10 parts by weight, and preferably within the range of 3 to 8 parts by weight.

As the butadiene-styrene vinyl pyridine terpolymer, use can be made of a number of such terpolymers which are well known to those skilled in the art. Such terpolymers frequently contain about 70 percent by weight butadiene, 15 percent by weight styrene and about 15 percent by weight vinyl pyridine, although these proportions can be varied and are not critical to the practice of this invention. Representative of suitable butadiene-styrene vinyl pyridine terpolymers include the terpolymers available from the Goodyear Tire and Rubber Company under the trade name "Pliolite VP100" and a number of terpolymers available from the General Tire and Chemical Company under the trade name "Gentac." For example, use is preferably made of "Gentac FS" which is a terpolymer having a comparatively low Mooney viscosity within the range of 35–45, although use can also be made of "Gentac 107" which is a terpolymer having a higher Mooney viscosity, generally within the range of 110–120. It has been found that generally superior results have been obtained with the use of Gentac FS since the lower Mooney viscosity of the material contributes improved adhesion characteristics of the resulting treated glass fibers.

One vinyl pyridine-butadiene-styrene terpolymer which is particularly well suited for use in the composition of this invention is a terpolymer marketed by the Goodyear Tire and Rubber Company under the product designation "LPF4545A." This particular latex system contains about the same relative amounts of vinyl pyridine, butadiene and styrene, but contains less emulsifier, usually less than 2 percent by weight. It is believed that the low emulsifier content of this terpolymer contributes to the stability of the overall treating composition.

The terpolymer component is generally employed in an amount sufficient to provide from 20–60 parts by weight, and preferably 35–50 parts by weight, of the terpolymer in the treating composition on a dry solids basis.

The butadiene-styrene-vinyl pyridine terpolymer, the dicarboxylated butadiene-styrene resin, and the resorcinol-formaldehyde resin are all compatible, each with the other, and operate to coat the fibers and fill the interstices between the fibers when applied as an impregnant in a glass fiber bundle whereby the fibers making up the bundle are capable of realignment in the direction of stress for maximizing the high strength properties of the impregnated bundle. The components are also somewhat compatible with the elastomeric materials forming the continuous phase of a glass fiber-elastomeric product to thereby permit glass fibers treated in accordance with the present invention to be blended with such elastomeric materials for advancement to a cured ur vulcanized stage whereby the treating material from the glass fiber bundles becomes an integral part of the elastomeric phase to intertie the treated glass fibers to the elastomeric material.

The incompatible wax component of the present invention is preferably a micro-crystalline paraffinic wax of the type described in the forementioned patent, and without limiting the present invention as to theory, it is believed that the wax serves at least a limited function as a rubber softener. The wax is normally employed in an amount in excess of that capable of remaining compatible with the solids makeup of the remainder of the treating composition whereby the wax component sweats out for concentration on the surfaces of the treated glass fibers or glass fiber bundles to provide a non-tacky surface and thereby permit treated glass fibers to be processed into yarns, threads, cords or fabrics, and/or to be wound onto and unwound from spools without seizure of binding, notwithstanding the elastomeric component with which the fibers are treated. Thus, the glass fibers can be treated with a composition that enhances good adhesion to the surfaces of glass fibers without interfering with the subsequent processing characteristics of the glass fibers. The composition also contains the necessary components to facilitate the bonding relationship between the glass fiber surfaces and the elastomeric material in the manufacture of glass fiber-reinforced elastomeric products.

The wax preferred for use in the present invention is a micro-crystalline paraffinic wax having a melting point within the range of 145°–150° F and sold under the designation "Vultex Wax Emulsion No. 9" by the General Latex and Chemical Corp. As will be appreciated by those skilled in the art, other paraffinic microcrystalline waxes having the described characteristics can be employed in the practice of this invention in lieu of or in addition to the Vultex wax specifically described. The amount of the wax component can be varied within the range of 3–25 parts by weight, and preferably 4–20 parts by weight, of the dry solids of the treating composition.

Having described the basic concepts of this invention, reference is now made to the following examples, which are provided by way of illustration and not by way of limitation, of the practice of this invention in treating glass fibers for subsequent combination with elastomeric materials in the manufacture of glass fiber-reinforced elastomeric products. In the preferred practice of the invention, a glass fiber bundle, in the form of one or more strands of fibers or in the form of a cord composed of two or more strands of glass fibers plied and/or twisted together, is subjected to impregnation with the composition of the invention. The glass fibers forming the bundle preferably have a thin size coating on the individual surfaces of the fibers from a conventional size composition such as one of those size compositions described in U.S. Pat. No. 3,424,608.

An impregnating composition representative of the concepts of the invention is prepared from the following

EXAMPLE 1

PART A:
- 732 parts by wt. — deionized water
- 1 part by wt. — sodium hydroxide
- 48 parts by wt. — resorcinol-formaldehyde polymer in the form of a latex containing 75% solids (Penacolite R2170)
- 16 parts by wt. — formalin (37% formaldehyde)

PART B:
- 900 parts by wt. — butadiene-styrene-vinyl pyridine terpolymer (42% solids) (Gentac PS)
- 80 parts by wt. — ammonium hydroxide PART C:
- 200 parts by wt. — water
- 15 parts by wt. — ammonium hydroxide
- 350 parts by wt. — dicarboxylated butadiene-styrene resin (50% solids) (Pliolite 4121)
- 100 parts by wt. — micro-crystalline paraffin wax (melting point 145°–150° F.)-Vultex Wax Emulsion No. 9 of General Latex and Chemical Corp. 56% solids)

Part A of the foregoing example is separately prepared by combining the ingredients, and the resulting mixture is aged for a few minutes with the alkali present to adjust the pH to 6 to 7. The remainder of the ingredients are then combined and the various parts are mixed together. However, it will be appreciated that variations in the order of mixing can be carried out to provide a stable system, depending somewhat upon the nature of the components and the relative amounts employed. It has been found that aging of the entire mixture is not essential, although best results are generally obtained when the resulting composition is aged for 10–24 hours or even longer prior to use in impregnating glass fiber bundles.

Impregnation with the aqueous composition prepared in accordance with Example 1 can be carried out by way of any of a variety of known techniques for the impregnation of glass fiber bundles. Referring specifically to FIG. 1 of the drawing, a strand 10 formed of a plurality of glass fibers which have preferably, although not necessarily, been sized in forming, is passed over a guide roller 12 for passage downwardly into an impregnating bath 14 containing the aqueous impregnating composition of Example 1. The bundle is then passed under a pair of rollers 16 to effect a sharp bend in the bundle which operates to open the bundle to facilitate more complete penetration of the aqueous treating composition in the bundle of glass fibers for complete impregnation of the bundle. The impregnated bundle is then raised from the bath for passage through a roller or die 18 which operates to remove excess treating composition from the bundle and to work the treating composition into the bundle. Thereafter, the endless bundle is advanced over roller 20 into a drying oven 22, such as a dielectric, microwave, hot gas, or radiant oven maintained at a temperature above ambient temperature, and preferably a temperature within the range of 65°–180° F., to accelerate removal of the aqueous diluent and to set the impregnant in situ in the glass fiber bundle. Drying will occur within a relatively short period of time, generally within 0.1 sec. to 3 min., depending upon the temperature of drying.

Figure 2:
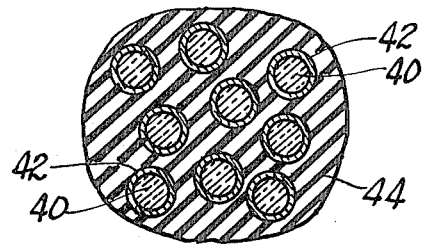
FIG. 2 is a cross-sectional view of a bundle of glass fibers treated in accordance with the method illustrated in FIG. 1.

The resulting bundle is shown in cross section in FIG. 2 of the drawing. As can be seen from this figure, the bundle is formed of a plurality of glass fibers 40 which have an optional size coating 42 on the surfaces of the individual filaments. The impregnant 44 in the form of the solids from the treating composition of this invention completely penetrates the bundle and serves to separate the glass fibers each from the other to form a unitary bundle structure.

Additional examples of this concept of the present invention may be illustrated by the following:

EXAMPLE 2

PART A:
  500 parts by wt. — distilled water
  1.5 parts by wt. — sodium hydroxide
  60 parts by wt. — resorcinol-formaldehyde resin (75% solids)
  20 parts by wt. — formalin
PART B:
  900 parts by wt. — vinyl pyridine-butadiene-styrene terpolymer (42% solids) (Gentac 107)
  80 parts by wt. — ammonium hydroxide
PART C:
  200 parts by wt. — water
  15 parts by wt. — ammonium hydroxide
  350 parts by wt. — dicarboxylated butadiene-styrene resin (50% solids) (Pliolite 4264)
  100 parts by wt. — Vultex Wax Emulsion No. 9 (56% solids)

EXAMPLE 3

PART A:
  730 parts by wt. — distilled water
  1.5 parts by wt. — tetramethyl ammonium hydroxide
  48 parts by wt. — resorcinol-formaldehyde latex (75% solids)
  16 parts by wt. — formalin
PART B:
  900 parts by wt. — butadiene-styrene-vinyl pyridine terpolymer (Gentac 107–42% solids)
  80 parts by wt. — ammonium hydroxide
  100 parts by wt. — water
  350 parts by wt. — dicarboxylated butadiene-styrene resin (50% solids)
  100 parts by wt. — Vultex Wax Emulsion No. 9(56% solids)

EXAMPLE 4

PART A:
  732 parts by wt. — distilled water
  1.5 parts by wt. — ammonium hydroxide
  48 parts by wt. — resorcinol-formaldehyde (75% solids)
  16 parts by wt. — formalin
PART B:
  900 parts by wt. — butadiene-styrene-vinyl pyridine terpolymer (42% solids) (LPF 4545A)
  80 parts by wt. — ammonium hydroxide
  350 parts by wt. — dicarboxylated butadiene-styrene resin (50% solids) (Pliolite 4121)
  50 parts by wt. — Vultex Wax Emulsion No. 9(56% solids)

Part A in each of the above examples is separately prepared by combining the ingredients. The remainder of the ingredients are combined and the various parts are then mixed together. Aging of the entire mixture is not essential but beneficial results accrue, such as greater adhesion and stabilization of the mixture, after aging the entire mixture for from 10–24 hours before use to impregnate the glass fiber bundle.

The foregoing compositions are prepared in accordance with the procedure described in Example 1, and the resulting compositions can be applied by impregnation to glass fiber bundles in accordance with the procedure described in Example 1. In general, the impregnating compositions used in the practice of this invention are diluted with sufficient water to provide a composition having a solids content within the range of 10–50 percent by weight. Application of the impregnating composition can be made in an amount sufficient to impregnate with dry solids of 5–30 percent by weight of the glass fiber bundle, and preferably 10–25 percent by weight. It is desirable to achieve as full impregnation as possible into the bundles of glass fibers to more effectively separate the fibers each from the other with the impregnating material since the solids are effective to cushion the fibers and to protect the fibers from destruction by mutual abrasion. The deeper the penetration, the more effective is the bond between the bundles of glass fibers and the elastomeric material with which the bundles of glass fibers are combined in the subsequent manufacture of glass fiber-elastomeric products.

The elastomeric material with which the impregnated bundle of glass fibers is combined constitutes a continuous phase. The elastomer constituting the continuous phase may be selected from elastomers of the type incorporated into the impregnating composition, or the elastomeric material may differ therefrom. The elastomer constituting a continuous phase can be employed in the cured or uncured stage or in the vulcanized or unvulcanized stage. It is believed that the tie-in between the impregnated bundle of glass fibers and the elastomer constituting the continuous phase occurs primarily during cure or vulcanization of the elastomeric materials in combination with the impregnated bundles.

More complete protection for the individual glass fibers and more complete coordination of the glass fibers with the elastomeric material constituting the continuous phase can be achieved when impregnating compositions of the type described above are modified for use as a size composition for application to individual glass fiber filaments, preferably as they are being formed. For this purpose, treating compositions of the type described above are further diluted with water to provide a solids content within the range of 5–30 percent by weight and are formulated to include a glass fiber anchoring agent. Representative of suitable anchoring agents which can be used in the practice of this invention are the organo silicons, their hydrolysis products and polymerization products (polysiloxane) of an organo silane having the formula:

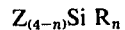

$$Z_{(4-n)} Si\ R_n$$

wherein Z is a readily hydrolyzable group such as alkoxy having one to four carbon atoms, e.g., methoxy, ethoxy, propoxy etc., or halogen, such as chlorine, $n$ is an integer from 1 to 3, and R is hydrogen or an organic group in which at least one R group is an alkyl group having one to ten carbon atoms, such as methyl, ethyl, propyl, etc.; alkenyl having one to ten carbon atoms, such as vinyl, allyl, etc.; cycloalkyl having four to eight carbon atoms, such as cyclopentyl, cyclohexyl, etc.; aryl having six to ten carbon atoms, such as phenyl, naphthyl, benzyl, etc.; alkoxy alkyl, such as methyloxyethyl, etc.; alkenylcarbonyloxyalkyl, such as carbonylpropylmethoxy, etc.; as well as the amino, epoxy, mercapto and halogen derivatives of the foregoing groups.

Illustrative of suitable silanes are ethyltrichlorosilane, propyltrimethoxy silane, vinyl trichlorosilane, allyl triethoxy silane, cyclohexylethyltrimethoxy silane, phenyl trichloro silane, phenyl dimethoxy silane, gamma-methacryloxypropyl-trimethoxy silane, gamma-aminopropyltriethoxy silane, beta-aminovinyldiethoxy silane, N-(gamma-triethoxysilylpropyl)-propylamine, gamma-aminoallyltriethoxy silane, para-aminophenyltriethoxy silane, N-(beta-aminoethyl)-gamma-aminopropyl-trimethoxy silane, gamma-chloropropyltrichlorosilane, gamma-glycidoxy propyltrimethoxy silane, 2,4-epoxy-cyclohexylethyltrimethoxy silane, gamma-mercaptopropyl-trimethoxy silane as well as a wide variety of others. It will be understood that the foregoing may be used in the form of the silane, the silanol or the polysiloxane formed by one or more of the foregoing materials.

Instead of organo silicon as described above, use can also be made of Werner complex compounds containing a carboxylato group coordinated with the trivalent nuclear chromic atom, and in which the carboxylato group may also contain an amino group or an epoxy group. Suitable Werner complex compounds include stearato chromic chloride, methacrylato chromic chloride, gamma-aminopropylato chromic chloride, glycine chromic complex or glycylato chromic chloride.

The anchoring agents of the type described above are normally employed in an amount within the range of 0.1 to 5 percent by weight of the treating composition.

A forming size embodying the concepts of this invention can be formulated as follows:

EXAMPLE 5

2 – 10 parts by wt. — resorcinol-formaldehyde resin

20 – 60 parts by wt. — butadiene-styrene-vinyl pyridine terpolymer

15 – 40 parts by wt. — dicarboxylated butadiene-styrene resin

3 – 30 parts by wt. — micro-crystalline paraffin wax 0.1 – 5 parts by wt. — anchoring agent

EXAMPLE 6

3 – 8 parts by wt. — resorcinol-formaldehyde resin

35 – 50 parts by wt. — vinyl pyridine-butadiene-styrene terpolymer

20 – 30 parts by wt. — dicarboxylated butadiene-styrene resin

4 – 20 parts by wt. — micro-crystalline paraffin wax 0.1 – 3 parts by wt. — anchoring agent The solids of the foregoing examples are formulated in the manner described in Examples 1–4 with the exception that the anchoring agent, such as gamma-aminopropyltriethoxy silane, is added to the system after hydrolyzation in aqueous medium, as by use of a quaternary ammonium hydroxide such as tetraethanol ammonium hydroxide or tetramethyl ammonium hydroxide and that the amount of water is increased for dilution of the solids to an amount within the range of 5–30 percent by weight. When applied as a size, it is possible to achieve a higher loading because of the individual coating of the glass fiber surfaces such that loading in the amount of 15–40 percent by weight of the sized glass fibers is possible.

The following is a specific example of the formulation to provide a size composition.

EXAMPLE 7

60 parts by wt. — resorcinol-formaldehyde resin (75% by wt. solids)

20 parts by wt. — formalin 1.5 parts by wt. — sodium hydroxide 900 parts by wt. — butadiene-styrene-vinyl pyridine terpolymer (42% solids)

95 parts by wt. — ammonium hydroxide 350 parts by wt. — dicarboxylated butadiene-styrene resin (50% solids) (Pliolite 4121)

100 parts by wt. — Vultex Wax Emulsion No. 9 (50% solids)

7 parts by wt. — gamma-aminopropyltriethoxy silane

Figure 3:
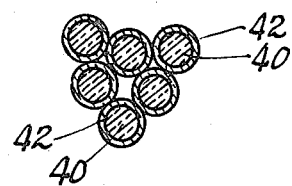
FIG. 3 is a cross-sectional view of glass fibers individually coated with the composition of this invention in accordance with another embodiment thereof.

Size compositions of the type illustrated in Examples 5 to 7 can be applied in any of a variety of conventional methods. The resulting fibers are shown in FIG. 3 of the drawing as formed with a coating 42 of the size composition on the surfaces of the individual glass fibers 40.

When the glass fibers are sized in forming with a composition embodying the modification of this invention, the sized glass fibers remain sufficiently non-tacky for processing directly into yarns, strands, cords or fabrics for use in the combination with the continuous phase elastomer. The sized fibers may be passed directly through a high frequency, dielectric, hot gas or radiant drying oven as a part of the forming process to insure a non-tacky bundle of coated glass fibers.

In fabricting the combinations of glass fibers, treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber-reinforced belts or in the manufacture of rubber tires reinforced with cords of glass fibers. The combinations of glass fibers and elastomeric materials are then processed in a conventional manner by molding and curing under heat and pressure or by vulcanizing for advancement of the elastomeric materials to a cured or vulcanized state while in combination with the treated glass fibers whereby the bundles of glass fibers become strongly integrated with the elastomeric material in the glass fiber-elastomeric product.

It will be understood that the size compositions, represented by Examples 5, 6, and 7, may also be employed as impregnating compositions, preferably with a lesser dilution by aqueous medium. The anchoring agent will continue to operate to facilitate the bonded relationship or integration between the elastomeric material of the glass fiber treating composition and the glass fiber surfaces.

It will be apparent from the foregoing that we have provided a new and improved composition for use in the treatment of glass fibers and preferably bundles formed thereof to enhance their utilization with elastomeric materials, even under conditions of high humidity, in the manufacture of glass fiber-elastomeric products while still retaining the desired degree of non-tackiness to enable the treated glass fiber bundle to be processed in substantially the conventional manner into cords, yarns, or fabrics or other arrangements desired for use in the final product.

It will be understood that invention exists not only in the compositions described but also in the process in which the compositions are employed in the treatment of glass fibers as well as the treated or impregnated glass fiber products formed thereof.

It will be understood that changes may be made in the details of formulation and methods of preparation without departing from the spirit of the invention, especially as defined in the following claims.

I claim:

1. A glass fiber bundle comprising a plurality of glass fibers and an impregnant in the bundle, the impregnant comprising 2 to 10 parts by weight of a resorcinol-aldehyde resin, 20 to 60 parts by weight of a butadiene-styrene-vinyl pyridine terpolymer, 15 to 40 parts by weight of a dicarboxylated butadiene-styrene resin having a ratio of styrene to butadiene of at least 50/50, and 3 to 30 parts by weight of an incompatible wax.

2. A glass fiber bundle as defined in claim 1 wherein the glass fibers forming the bundle have a thin size coating on the surfaces thereof.

3. A glass fiber bundle as defined in claim 1 wherein the impregnant also includes an anchoring agent.

4. A glass fiber bundle as defined in claim 1 wherein the fiber bundle is in the form of a cord formed of a plurality of strands of glass fibers.

5. A glass fiber bundle as defined in claim 4 wherein the strands forming the cords are twisted and plied together.

6. A glass fiber bundle as defined in claim 1 wherein the fiber bundle is in the form of a woven or non-woven fabric formed of fibers in the form of cords.

7. A glass fiber bundle comprising a plurality of glass fibers, a thin size coating on the surfaces of the glass fibers and an impregnant in the bundle, the impregnant comprising 2 to 10 parts by weight of a resorcinol-aldehyde resin, 20 to 60 parts by weight of a butadiene-styrene-vinyl pyridine terpolymer, 15 to 40 parts by weight of a dicarboxylated butadiene-styrene resin having a ratio of styrene to butadiene of at least 50/50, and 3 to 30 parts by weight of an incompatible wax.

8. Glass fibers having a thin coating thereon, said coating comprising 2 to 10 parts by weight of a resorcinol-aldehyde resin, 20 to 60 parts by weight of a butadiene-styrene-vinyl pyridine terpolymer, 15 to 40 parts by weight of a dicarboxylated butadiene-styrene resin having a ratio of styrene to butadiene of at least 50/50, and 3 to 30 parts by weight of an incompatible wax.

9. Glass fibers as defined in claim 8 wherein the coating includes an anchoring agent.

10. In a glass fiber-reinforced elastomeric product in which an elastomeric material constitutes a continuous phase in which the glass fibers are distributed, the improvement in the bonding relationship of the glass fibers with the elastomeric material comprising a coating on the glass fibers formed of 2 to 10 parts by weight of a resorcinol-aldehyde resin, 20 to 60 parts by weight of a butadiene-styrene-vinyl pyridine terpolymer, 15 to 40 parts by weight of a dicarboxylated butadiene-styrene resin having a ratio of styrene to butadiene of at least 50/50, and 3 to 30 parts by weight of an incompatible wax.

11. A product as defined in claim 10 which includes an anchoring agent in an amount within the range of 0.1 to 5.0 percent by weight.

12. A product as defined in claim 10 wherein the coating is a coating on the individual glass fiber filaments.

13. A product as defined in claim 10 wherein the glass fibers are in the form of bundles of glass fibers, and the coating constitutes an impregnant in the bundle.

14. A product as defined in claim 13 wherein the glass fibers forming the bundles have a thin size coating on the surfaces thereof.

15. A product as defined in claim 13 wherein the bundles are formed of strands of glass fibers plied and twisted together.

16. In a glass fiber-reinforced elastomeric product in which an elastomeric material constitutes a continuous phase in which bundles of sized glass fibers are distributed, the improvement comprising an impregnant formed of 2 to 10 parts by weight of a resorcinol-aldehyde resin, 20 to 60 parts by weight of a butadiene-styrene-vinyl pyridine terpolymer, 15 to 40 parts by weight of a dicarboxylated butadiene-styrene resin having a ratio of styrene to butadiene of at least 50/50, and 3 to 30 parts by weight of an incompatible wax.

17. A product as defined in claim 16 wherein the bundles are formed of strands of glass fibers plied and twisted together.

* * * * *